US011620457B2

(12) United States Patent
Lebanoff et al.

(10) Patent No.: US 11,620,457 B2
(45) Date of Patent: Apr. 4, 2023

(54) LEARNING TO FUSE SENTENCES WITH TRANSFORMERS FOR SUMMARIZATION

(71) Applicant: ADOBE INC., San Jose, CA (US)

(72) Inventors: Logan Lebanoff, Winter Haven, FL (US); Franck Dernoncourt, San Jose, CA (US); Doo Soon Kim, San Jose, CA (US); Lidan Wang, San Jose, CA (US); Walter Chang, San Jose, CA (US)

(73) Assignee: ADOBE INC., San Jose, CA (US)

( * ) Notice: Subject to any disclaimer, the term of this patent is extended or adjusted under 35 U.S.C. 154(b) by 257 days.

(21) Appl. No.: 17/177,372

(22) Filed: Feb. 17, 2021

(65) Prior Publication Data

US 2022/0261555 A1    Aug. 18, 2022

(51) Int. Cl.
*G06F 40/40* (2020.01)
*G06F 40/284* (2020.01)
*G06F 40/166* (2020.01)
*G06N 3/04* (2006.01)
*G06N 3/08* (2006.01)
*G06F 40/30* (2020.01)

(52) U.S. Cl.
CPC .......... *G06F 40/40* (2020.01); *G06F 40/166* (2020.01); *G06F 40/284* (2020.01); *G06N 3/0454* (2013.01); *G06N 3/08* (2013.01); *G06F 40/30* (2020.01)

(58) Field of Classification Search
CPC ...... G06F 40/40; G06F 40/166; G06F 40/284; G06F 40/30; G06F 40/16; G06F 40/216; G06F 40/295; G06F 40/289; G06N 3/0454; G06N 3/08

USPC ........................................................... 704/9
See application file for complete search history.

(56) References Cited

PUBLICATIONS

Barzilay, et al., "Information Fusion in the Context of Multi-Document Summarization", In Proceedings of the 37th Annual Meeting of the Association for Computational Linguistics, pp. 550-557, Coiiege Park, Maryland, USA, Association for Computational Linguistics, 1999.

Chen, et al., "Fast Abstractive Summarization with Reinforce-Selected Sentence Rewriting", In Proceedings of the 56th Annual Meeting of the Association for Computational Linguistics (vol. 1: Long Papers), pp. 675-686, Melbourne, Australia, Association for Computational Linguistics, 2018.

Clark, et al., "What does BERT look at? An Analysis of BERT's Attention", In Proceedings of the 2019 ACL Workshop BlackboxNLP: Analyzing and Interpreting Neural Networks for NLP, pp. 276-286, Florence, Italy, Association for Computational Linguistics, 2019.

(Continued)

*Primary Examiner* — Thierry L Pham
(74) *Attorney, Agent, or Firm* — F. Chau & Associates, LLC

(57) ABSTRACT

Systems and methods for sentence fusion are described. Embodiments receive coreference information for a first sentence and a second sentence, wherein the coreference information identifies entities associated with both a term of the first sentence and a term of the second sentence, apply an entity constraint to an attention head of a sentence fusion network, wherein the entity constraint limits attention weights of the attention head to terms that correspond to a same entity of the coreference information, and predict a fused sentence using the sentence fusion network based on the entity constraint, wherein the fused sentence combines information from the first sentence and the second sentence.

20 Claims, 9 Drawing Sheets

(56) References Cited

PUBLICATIONS

Daume III, et al., "Generic Sentence Fusion is an Ill-Defined Summarization Task", In Text Summarization Branches Out, pp. 96-103. Barcelona, Spain, Association for Computational Linguistics, 2004.
Devlin, et al., BERT: Pre-training of Deep Bidirectional Transformers for Language Understanding, In Proceedings of the 2019 Conference of the North American Chapter of the Association for Computational Linguistics: Human Language Technologies, vol. 1 (Long and Short Papers), pp. 4171-4186, Minneapolis, Minnesota, Association for Computational Linguistics, 2019.
Dong, et al., "Unified Language Model Pre-training for Natural Language Understanding and Generation", In H. Wallach, H. Larochelle, A. Beygelzimer, F. dAlché-Buc, E. Fox, and R. Garnett, editors, Advances in Neural Information Processing Systems 32, pp. 13063-13075, Curran Associates, Inc., 2019.
Durmus, et al. "FEQA: A Question Answering Evaluation Framework for Faithfulness Assessment in Abstractive Summarization", In Proceedings of the 58th Annual Meeting of the Association for Computational Linguistics, pp. 5055-5070, Online, Association for Computational Linguistics, 2020.
Elsner et al., "Learning to Fuse Disparate Sentences", In Proceedings of the Workshop on Monolingual Text-To-Text Generation, pp. 54-63, Portland, Oregon, Association for Computational Linguistics, 2011.
Falke, et al., "Ranking Generated Summaries by Correctness: An Interesting but Challenging Application for Natural Language Inference", In Proceedings of the 57th Annual Meeting of the Association for Computational Linguistics, pp. 2214-2220, Florence. Italy, Association for Computational Linguistics, 2019.
Filippova, et al., "Sentence Fusion via Dependency Graph Compression", In Proceedings of the 2008 Conference on Empirical Methods in Natural Language Processing, pp. 177-185, Honolulu, Hawaii, Association for Computational Linguistics, 2008.
Gehrmann, et al., "Bottom-Up Abstractive Summarization" In Proceedings of the 2018 Conference on Empirical Methods in Natural Language Processing, pp. 4098-4109, Brussels, Belgium, Association for Computational Linguistics, 2018.
Geva, et al., "DiscoFuse: A Large-Scale Dataset for Discourse-Based Sentence Fusion", In Proceedings of the 2019 Conference of the North American Chapter of the Association for Computational Linguistics: Human Language Technologies, vol. 1 (Long and Short Papers), pp. 3443-3455, Minneapolis, Minnesota, Association for Computational Linguistics, 2019.
Grosz, et al., "Centering: A Framework for Modeling the Local Coherence of Discourse", Computational Linguistics, 21(2):203-225, 1995.
Halliday et al., "Cohesion in English", English Language Series, Longman Group Ltd., 1976, 195 pages.
Ladhak, et al., "Exploring Content Selection in Summarization of Novel Chapters", In Proceedings of the 58th Annual Meeting of the Association for Computational Linguistics, pp. 5043-5054, Online, Association for Computational Linguistics, 2020.
Lebanoff, et al., "Analyzing Sentence Fusion in Abstractive Summarization", In Proceedings of the 2nd Work-shop on New Frontiers in Summarization, pp. 104-110, Hong Kong, China, Association for Computational Linguistics, 2019.
Lebanoff, et al., "Understanding Points of Correspondence between Sentences for Abstractive Summarization", In Proceedings of the 58th Annual Meeting of the Association for Computational Linguistics: Student Research Workshop, Seattle, United States, Association for Computational Linguistics, 2020, 8 pages.
Lewis, et al., "BART: Denoising Sequence-to-Sequence Pre-training for Natural Language Generation, Translation, and Comprehension", 2020, 10 pages.
Lin, "Rouge: A Package for Automatic Evaluation of Summaries", In Text Summarization Branches Out, pp. 74-81, Barcelona, Spain, Association for Computational Linguistics. 2004.
Liu, et al, "Hierarchical Transformers for Multi-Document Summarization", In Proceedings of the 57th Annual Meeting of the Association for Camputational Linguistics, pp. 5070-5081, Florence, Italy, Association for Computational Linguistics, 2019.
Marsi, et al., "Explorations in Sentence Fusion", In Proceedings of the Tenth European Warkshop an Natural Language Generation (ENLG-05), 2005, 9 pages.
Mehdad, et al., "Abstractive Meeting Summarization with Entailment and Fusion", In Proceedings of the 14th European Workshop on Natural Language Generation, pp. 136-146, Sofia, Bulgaria, Association for Computational Linguistics, 2013.
Narayan, et al.,. "Don't Give Me the Details, Just the Summary! Topic-Aware Convolutional Neural Networks for Extreme Summarization", In Proceedings of the 2018 Conference on Empirical Methods in Natural Language Processing, pp. 1797-1807, Brussels, Belgium. Association for Computational Linguistics, 2018.
Papineni, et al., "BLEU: A Method for Automatic Evaluation of Machine Translation", In Proceedings of the 40th Annual Meeting of the Association for Computational Linguistics, pp. 311-318, Philadelphia, Pennsylvania. USA, Association for Computational Linguistics, 2002.
Paulus, et al., "A Deep Reinforced Model for Abstractive Summarization", In International Conference on Learning Representations, 2018, 13 pages.
See, et al., "Get To The Point: Summarization with Pointer-Generator Networks", In Proceedings of the 55th Annual Meeting of the Association for Computational Linguistics (vol. 1: Long Papers), pp. 1073-1083, Vancouver, Canada, Association for Computational Linguistics, 2017.
Strubell, et al., "Linguistically-informed Self-Attention for Semantic Role Labeling". In Proceedings of the 2018 Conference on Empirical Methods in Natural Language Processing, pp. 5027-5038, Brussels, Belgium, Association for Computational Linguistics, 2018.
Thadani, et al., "Supervised Sentence Fusion with Single-Stage Inference" , In Proceedings of the Sixth International Joint Conference on Natural Language Processing, pp. 1410-1418, Nagoya, Japan, Asian Federation of Natural Language Processing, 2013.
Vaswani, et al., "Attention Is All You need", In I. Guyon, U. V. Luxburg, S. Bengio, H. Wallach, R. Fergus, S. Vishwanathan, and R. Garnett, editors, Advances in Neural Information Processing Systems 30, pp. 5998-6008, Curran Associates, Inc., 2017.
Wang, et al., "Asking and Answering Questions to Evaluate the Factual Consistency of Summaries", In Proceedings of the Annual Conference of the Association for Computational Linguistics (ACL), 2020, 13 pages.
Zhang, et al., "BERTscore: Evaluating Text Generation With Bert", In international Conference on Learning Representations, 2020, 43 pages.
Zhao, et al., "MoverScore: Text Generation Evaluating with Contextualized Embeddings and Earth Mover Distance", In Proceedings of the 2019 Conference on Empirical Methods in Natural Language Processing and the 9th International Joint Conference on Natural Language Processing (EMNLP-UCNLP), pp. 563-578, Hong Kong, China, Association for Computational Linguistics, 2019.

LEARNING TO FUSE SENTENCES WITH TRANSFORMERS FOR SUMMARIZATION

BACKGROUND

The following relates generally to natural language processing (NLP), and more specifically to sentence fusion.

Sentence fusion refers to the task of joining related sentences that overlap in content into a single coherent sentence. The fused output should preserve the information in the input sentences as well as their semantic relationship. Sentence fusion is important in many NLP applications such as text summarization, question answering, and retrieval-based dialogues. For example, a user may provide a pair of sentences and then a sentence fusion network can predict a fused sentence that combines information from the first sentence and the second sentence.

In some cases, machine learning models are used to perform sentence fusion. The summarization systems generate ungrammatical sentences, and sometimes introduce incorrect information that was not present in the source text. Therefore, there is a need in the art for an improved text summarization system that is efficient and can produce fused output that remains accurate and truthful to original input text.

SUMMARY

The present disclosure describes systems and methods for sentence fusion. In some embodiments, a supervised learning model is used to generate a fused sentence that combines information from a pair of sentences. In one or more embodiments, an entity constraint is used to constrain certain layers of the machine learning model. As a result, the machine learning model can be more efficiently trained to recognize entities and cohesive ties associated with a pair of sentences.

A method, apparatus, and non-transitory computer readable medium for sentence fusion are described. Embodiments of the method, apparatus, and non-transitory computer readable medium are configured to receive coreference information for a first sentence and a second sentence, wherein the coreference information identifies entities associated with both a term of the first sentence and a term of the second sentence, apply an entity constraint to an attention head of a sentence fusion network, wherein the entity constraint limits attention weights of the attention head to terms that correspond to a same entity of the coreference information, and predict a fused sentence using the sentence fusion network based on the entity constraint, wherein the fused sentence combines information from the first sentence and the second sentence.

An apparatus and method for sentence fusion are described. Embodiments of the apparatus and method include a coreference model configured to generate coreference information for a first sentence and a second sentence, wherein the coreference information identifies entities associated with both a term of the first sentence and a term of the second sentence and a sentence fusion network comprising a transformer model wherein at least one attention head of the transformer model is constrained by an entity constraint that limits attention weights of the attention head to words that correspond to a same entity of the coreference information.

A method, apparatus, and non-transitory computer readable medium for training a neural network are described. Embodiments of the method, apparatus, and non-transitory computer readable medium are configured to receive a training set, wherein an element of the training set includes a pair of sentences and a ground truth fused sentence, identify coreference information for the pair of sentences, wherein the coreference information identifies entities associated with terms from the pair of sentences, apply an entity constraint to an attention head of a sentence fusion network, wherein the entity constraint limits attention weights of the attention head to words that correspond to a same entity of the coreference information, predict a fused sentence using the sentence fusion network based on the entity constraint, compute a loss function based on the predicted fused sentence and the ground truth fused sentence, and update parameters of the sentence fusion network based on the loss function.

DETAILED DESCRIPTION

Figure 1:
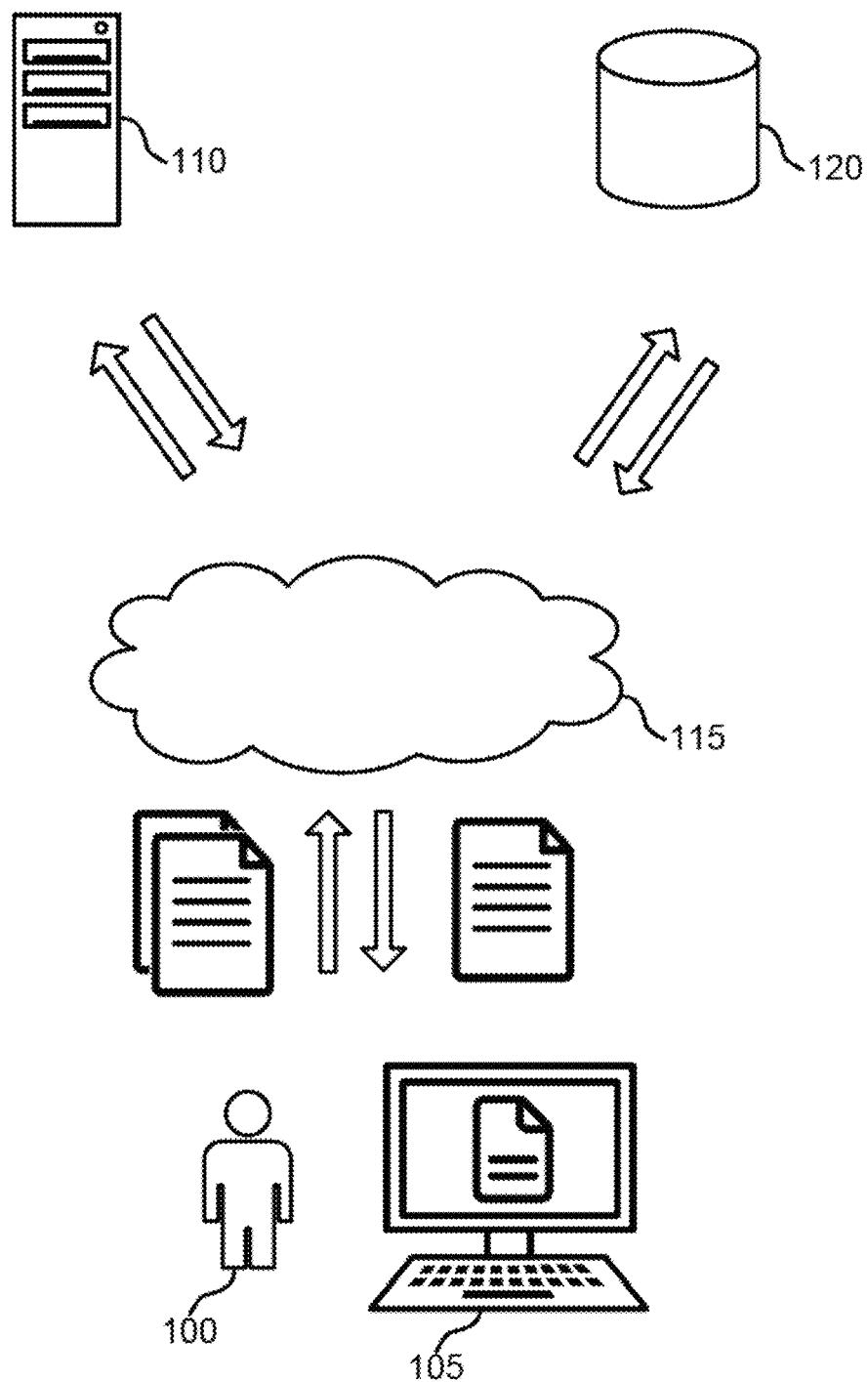
FIG. 1 shows an example of a system for sentence fusion according to aspects of the present disclosure.

The present disclosure describes systems and methods for sentence fusion. In some embodiments, a supervised learning model is used to generate a fused sentence that combines information from a pair of sentences. In one or more embodiments, an entity constraint is used to constrain certain layers of the machine learning model. As a result, the machine learning model can be more efficiently trained to recognize entities and cohesive ties associated with a pair of sentences.

Recently, summarization systems have been used to combine similar elements across related text and generate a summary of input text. In some cases, these summarization systems include a trained abstractive summarizer that is rewarded for generating summaries that contain the same words as in abstracts written by human users (e.g., measured by metrics such as ROUGE). However, these conventional systems are limited to combining similar sentences. Furthermore, conventional summarization systems often generate incorrect and untruthful results that fail to retain the original meaning of the input text.

One or more embodiments of the present disclosure provide an improved text summarization apparatus that can fuse disparate sentences that contain fundamentally different content using a sentence fusion network. In some examples, a coreference model generates coreference information for a pair of input sentences. The coreference model can tie entities of the pair of sentences tougher using points of correspondence (PoC). The coreference information is used to apply an entity constraint to a portion of a machine learning model for sentence fusion (e.g., to an attention head of a transformer architecture).

By applying the unconventional steps of generating coreference information and applying an entity constraint to a machine learning model, one or more embodiments of the present disclosure provide an output fused sentence that is linguistically plausible and semantically truthful to the input text. As a result, the improved text summarization apparatus can summarize long documents and book chapters with increased efficiency and accuracy. The output of the resulting text summarization is more accurate, succinct, and truthful than the output of conventional systems.

Embodiments of the present disclosure may be used in the context of abstractive summarization including products such as Adobe® Experience Manager, Document Cloud, Photoshop® (tutorials) and Sensei. The text summarization apparatus based on the present disclosure may take a document including a pair of sentences, and efficiently fuse the pair of sentences and provide a text summary based on fused sentence. An example of an application of the inventive concept in the summarization context is provided with reference to FIGS. 1, 2, and 3. Details regarding the architecture of an example text summarization apparatus are provided with reference to FIGS. 4 and 5. An example of a process for sentence fusion is provided with reference to FIGS. 6 and 7. An example of a mask matrix is provided with reference to FIG. 8. A description of an example training process for a sentence fusion network is described with reference to FIG. 9.

Text Summarization

FIG. 1 shows an example of a system for sentence fusion according to aspects of the present disclosure. The example shown includes user 100, user device 105, text summarization apparatus 110, cloud 115, and database 120. Text summarization apparatus 110 is an example of, or includes aspects of, the corresponding element described with reference to FIG. 4.

In an example of FIG. 1, the user 100 communicates with the text summarization apparatus 110 via the user device 105 and the cloud 115, e.g., by sending a text input. According to an example, the text input may include at least two sentences or a pair of sentences. The first sentence may be "Allan Donald has confirmed he is to step down as South Africa bowling coach." The second sentence may be "The 48-year-old former Test paceman has served his country as part of the coaching team since 2011." The output may be something like "Allan Donald served as South African bowling coach since 2011."

The text summarization apparatus 110 receives coreference information for a first sentence and a second sentence based on the text input from the user 100. Additionally, the coreference information identifies entities associated with both a term of the first sentence and a term of the second sentence. According to the example above, certain text phrases or chunks convey the same or similar meanings, e.g., "Allan Donald" and "The 48-year-old former Test paceman", "South Africa bowling coach" and "part of the coaching team". A coreference model of the text summarization apparatus 110 is used to generate such coreference information for the first sentence and the second sentence.

The text summarization apparatus 110 is configured to stitch portions of text together into one sentence (e.g., abstractive summarization). The text summarization apparatus 110 chooses which sentences to fuse, what content from each of the sentences to retain and how best to present that information to the user 100.

The text summarization apparatus 110 then applies an entity constraint to an attention head of a sentence fusion network. The entity constraint limits attention weights of the attention head to terms that correspond to a same entity of the coreference information. The text summarization apparatus 110 predicts a fused sentence using the sentence fusion network based on the entity constraint. The fused sentence is an abstract summarization of the first sentence and the second sentence. According to the example above, a fused sentence is "Allan Donald served as South Africa bowling coach since 2011", which combines information from the first sentence and the second sentence. The fused sentence is also accurate and truthful with reference to the original text input.

The user 100 views text summary (e.g., a fused sentence based on the pair of sentences) on a user device 105. The user device 105 may be a personal computer, laptop computer, mainframe computer, palmtop computer, personal assistant, mobile device, or any other suitable processing apparatus.

The text summarization apparatus 110 may include a supervised network model for generating text summary based on a fused sentence. The network model is also referred to as a sentence fusion network. The sentence fusion network increases the performance by utilizing points of correspondence linkages explicitly in a Transformer architecture to increase performance of sentence fusion. Additionally, an entity constraint is applied to an attention head of the sentence fusion network.

In some embodiments, the text summarization apparatus 110 may include a Transformer architecture to fuse sentences and algorithms to increase their ability to perform sentence fusion by leveraging the knowledge of points of correspondence between sentences. After extensive experiments, the effects of different design choices on Transformer's performance are investigated and evaluated. The findings show the importance of modeling points of correspondence between sentences for effective sentence fusion. Unlike existing summarization systems that prone to produce ungrammatical, nonsensical, or otherwise ill-formed results, the text summarization apparatus 110 can fuse sentences accurately and effectively.

In an embodiment, a sentence fusion network of the text summarization apparatus 110 is configured to fuse disparate sentences by enhancing a Transformer architecture with points of correspondence between sentences, which tie two sentences together into a coherent text. The sentence fusion task includes choosing content from each sentence and weaving the content pieces together into an output sentence that is linguistically plausible and semantically truthful to the original input. This is distinct from existing technology that connects two sentences using discourse markers.

In some cases, the text summarization apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term cloud 115 is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database 120 controller may operate automatically without user interaction.

Figure 2:
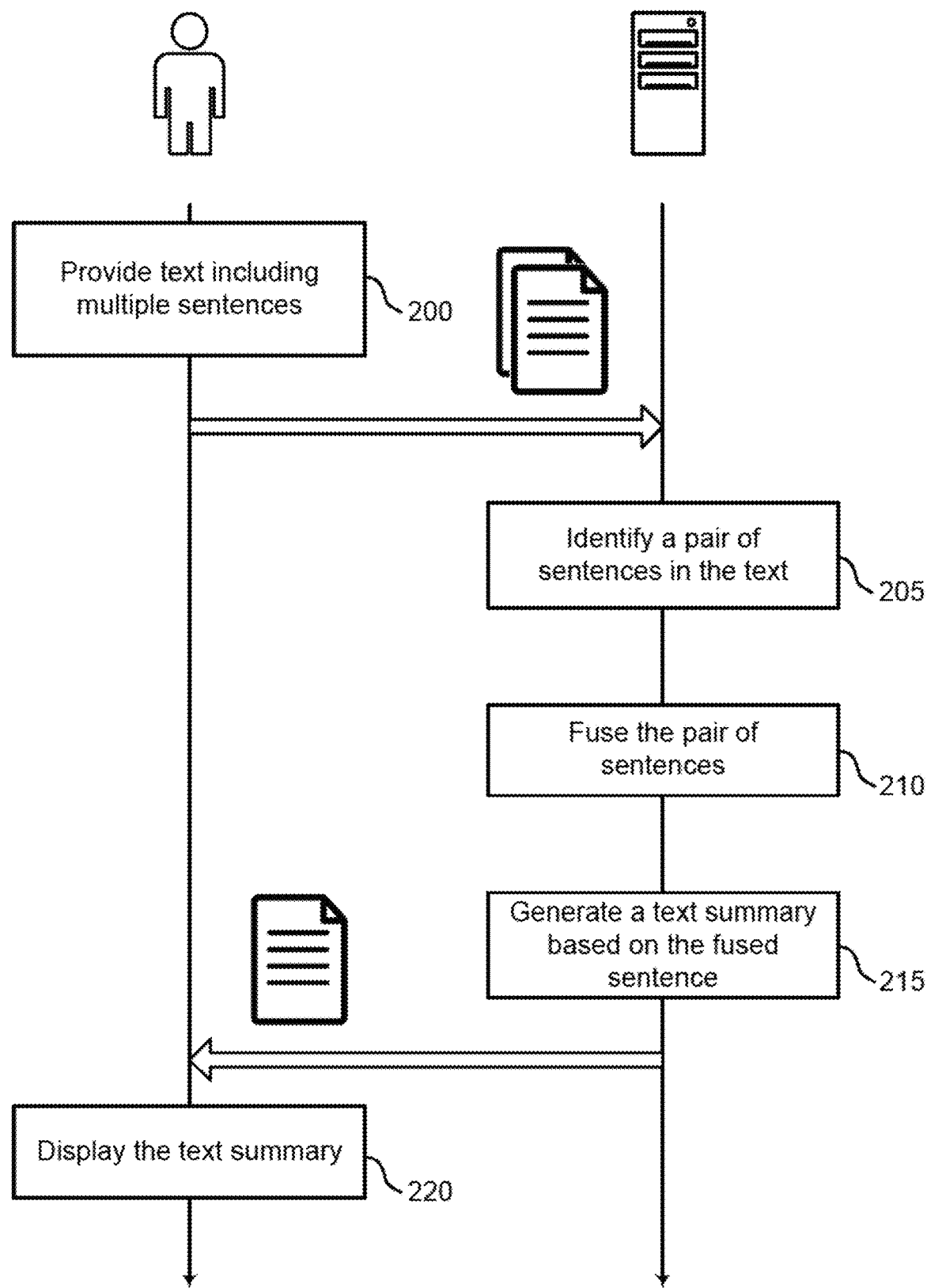
FIG. 2 shows an example of a process for text summarization according to aspects of the present disclosure.

FIG. 2 shows an example of a process for text summarization according to aspects of the present disclosure. In some examples, these operations are performed by a system such as the text summarization system of claim 1. The system may include a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the user provides text input including multiple sentences. The text input may include a document having at least a pair of sentences. In some examples, the user can select the document and feed the document to the text summarization system (the system is herein represented by a server icon) using a user interface implemented on a user device. Alternatively, the user can access a document stored in a database and download the document through a cloud. The document is then passed to the system. In some cases, the operations of this step refer to, or may be performed by, a user as described with reference to FIG. 1.

At operation 205, the system identifies a pair of sentences in the text input. According to an example, the text input includes a first sentence and a second sentence. The first sentence is "Allan Donald has confirmed he is to step down as South Africa bowling coach." The second sentence is "The 48-year-old former Test paceman has served his country as part of the coaching team since 2011." In some cases, the operations of this step refer to, or may be performed by, a coreference model as described with reference to FIG. 4.

At operation 210, the system fuses the pair of sentences. According to the example above, a fused sentence is "Allan Donald served as South Africa bowling coach since 2011." The fused sentence is generated using a sentence fusion network of the system. The sentence fusion network includes an enriched Transformer architecture receiving points of correspondence as model input. In some cases, the operations of this step refer to, or may be performed by, a sentence fusion network as described with reference to FIGS. 4 and 5.

At operation 215, the system generates a text summary based on the fused sentence. The text summary is relatively short compared to the text input. Furthermore, the text summary or abstraction remains accurate and truthful to the original text input. In the example above, the text summary including "Allan Donald served as South Africa bowling coach since 2011" is an abstractive summarization for audience who want to have a high-level understanding of the content of the input document. In some cases, the operations of this step refer to, or may be performed by, a text summarization component as described with reference to FIG. 4.

At operation 220, the system displays the text summary. The system may display the text summary through a user interface of the user device. In some examples, the user can choose to select a different document and feed the different document to the system using the user device through a cloud. Alternatively, the user can choose to edit the generated text summary and provide feedback. In some cases, the operations of this step refer to, or may be performed by, a text summarization component as described with reference to FIG. 4.

Figure 3:
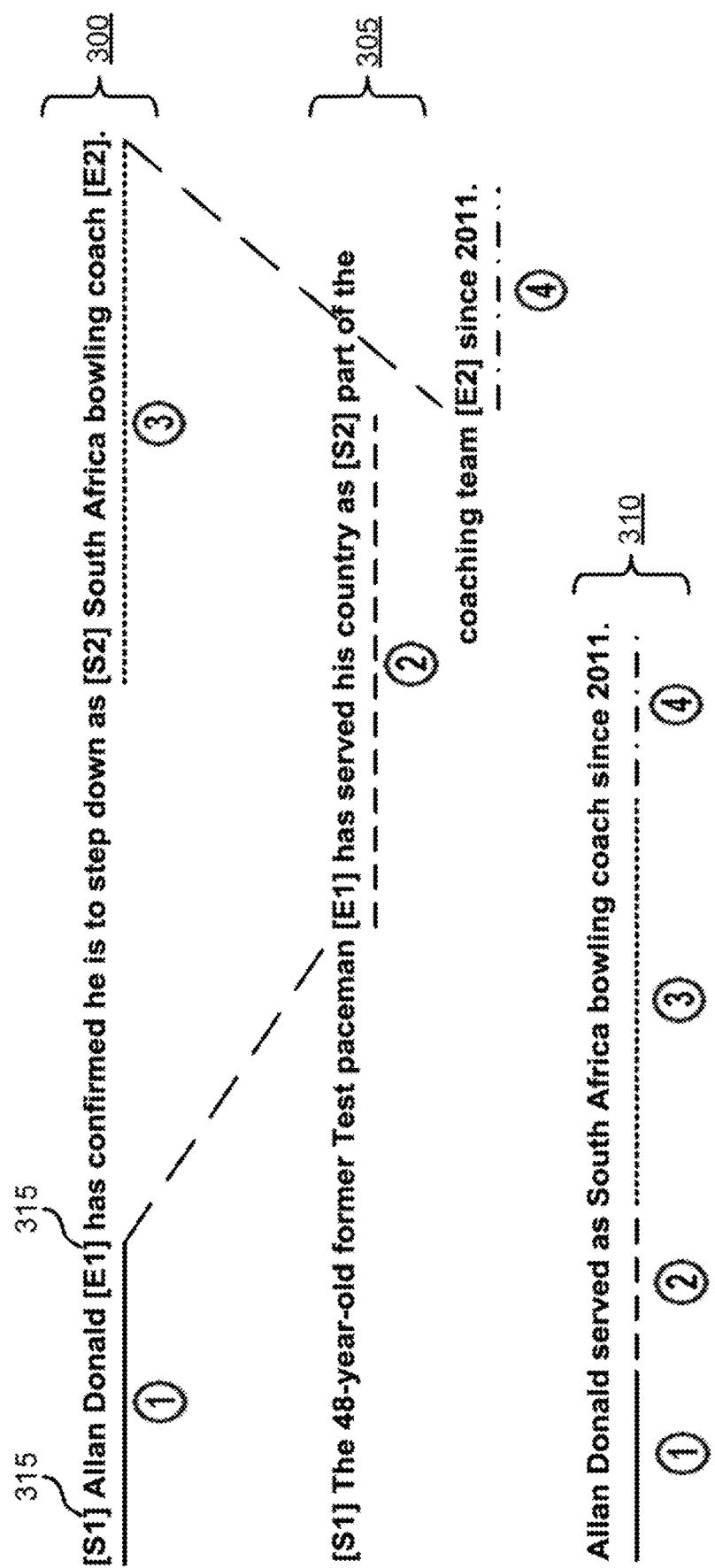
FIG. 3 shows an example of sentence fusion according to aspects of the present disclosure.

FIG. 3 shows an example of sentence fusion according to aspects of the present disclosure. The example shown includes first sentence 300, second sentence 305, fused sentence 310, and token 315. The first sentence 300 is "Allan Donald has confirmed he is to step down as South Africa bowling coach." The second sentence 305 is "The 48-year-old former Test paceman has served his country as part of the coaching team since 2011."

In some embodiments, sentence fusion involves determining what content from each sentence (i.e., the first sentence 300 and the second sentence 305) to retain, and how best to weave text pieces together into a well-formed sentence (i.e., a fused sentence 310). Points of correspondence (PoC) are text chunks that convey the same or similar meanings, e.g., "Allan Donald" and "The 48-year-old former Test paceman" covey substantially similar meanings. "South Africa bowling coach" and "part of the coaching team" also convey substantially similar meanings. According to the example above, the fused sentence is "Allan Donald served as South Africa bowling coach since 2011." Fused sentence 310 is an example of, or includes aspects of, the corresponding element described with reference to FIG. 8.

A points of correspondence (PoC) is a pair of text chunks that express the same or similar meanings. According to the example shown in FIG. 3, Allan Donald vs. The 48-year-old former Test paceman, South Africa bowling coach vs. part of the coaching team are two PoCs. In some cases, the use of alternative expressions for conveying the same meanings is standard practice in writing, as it increases lexical variety and reduces redundancy. However, existing summarization systems cannot make effective use of these expressions to establish correspondence between sentences, often leading to ungrammatical and nonsensical outputs. One or more embodiments of the present disclosure provide a text summarization apparatus that can use points of correspondence to establish correspondence between a pair of sentences.

In an embodiment, the sentence fusion network introduces special tokens 315 ([$S_k$] and [$E_k$]) to mark the start and end of each PoC mention. All mentions pertaining to the k-th PoC share the same start/end tokens 315. According to the example, "Allan Donald" and "the 48-year-old former Test paceman" are enriched with the same special tokens 315. [$S_1$] and [$E_1$] are used to mark the start and end of this PoC mention, respectively. In another embodiment, special tokens 315 are used to assist in linking coreference mentions, creating long-range dependencies between them and encouraging the network model to use these mentions interchangeably in generation. In some cases, tokens 315 [$E_k$] is also referred to as an end-of-sentence token.

In an embodiment, the sentence fusion network enriches the Transformer's source sequence with markups that indicate PoC linkages. In some examples, PoC information is assumed to be available for any fusion instance.

In some embodiments, PoC annotations represent cohesive ties between input sentences. The sentence fusion network is able to recognize these ties and make use of them. The sentence fusion network is flexible and permits a varying number of PoC per fusion instance. In an embodiment, the sentence fusion network employs a decoder-only Transformer architecture. As a result, incorporating PoC into the Transformer architecture increases performance of sentence fusion.

Network Architecture

Figure 4:
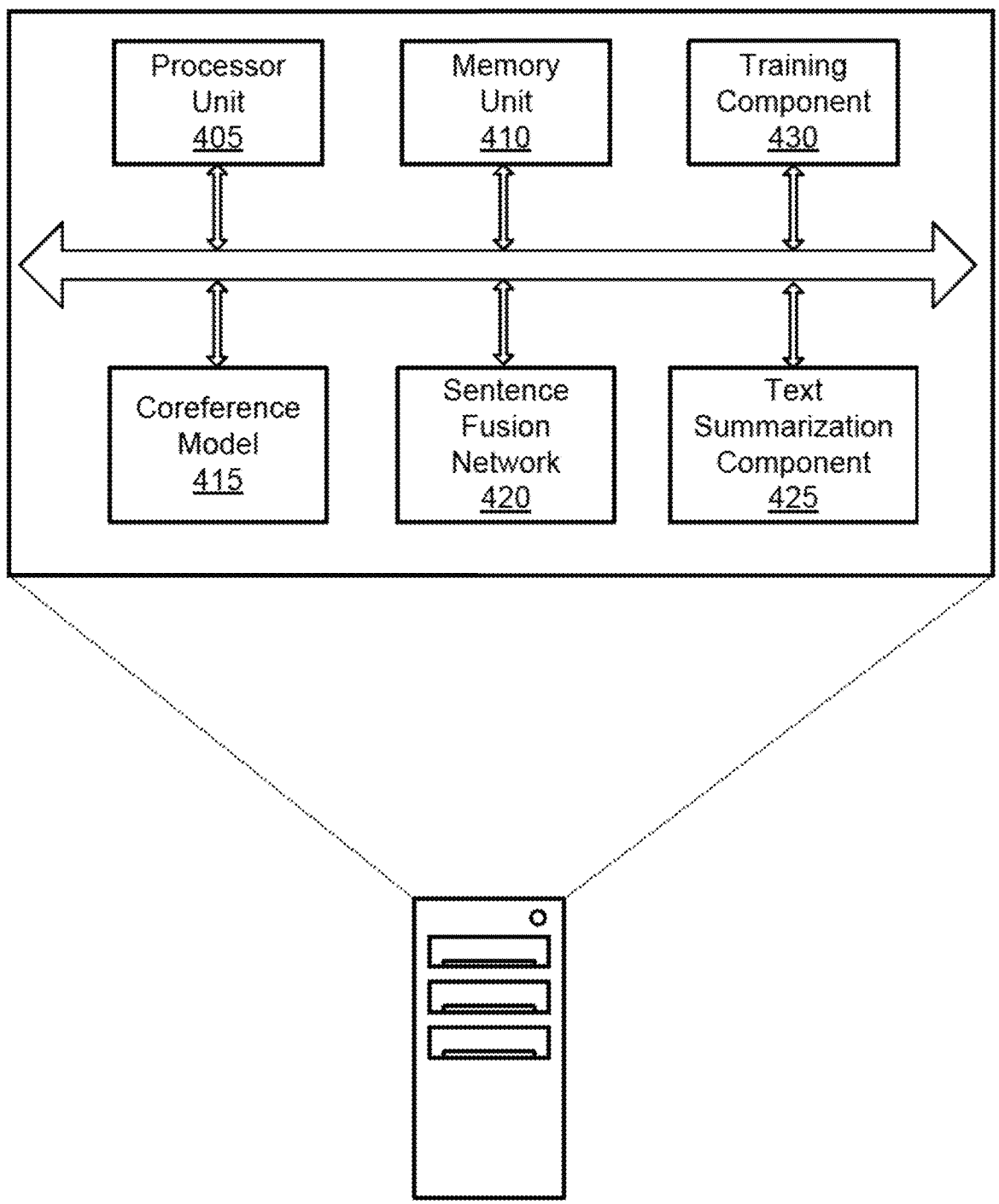
FIG. 4 shows an example of an apparatus for text summarization according to aspects of the present disclosure.

FIG. 4 shows an example of an apparatus for text summarization according to aspects of the present disclosure. A text summarization apparatus may include processor unit 405, memory unit 410, coreference model 415, sentence fusion network 420, text summarization component 425, and training component 430. The text summarization apparatus is an example of, or includes aspects of, the corresponding element described with reference to FIG. 1.

In one embodiment, the text summarization apparatus includes a coreference model 415 configured to generate coreference information for a first sentence and a second sentence, wherein the coreference information identifies entities associated with both a term of the first sentence and a term of the second sentence and a sentence fusion network 420 comprising a transformer model wherein at least one attention head of the transformer model is constrained by an entity constraint that limits attention weights of the attention head to words that correspond to a same entity of the coreference information. In some cases, sentence fusion network 420 is also referred to as a network model.

According to some embodiments of the present disclosure, the text summarization apparatus includes a computer implemented artificial neural network (ANN) that produces a text summary based on text input from a user. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

A processor unit 405 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 405 is configured to operate a memory array using a memory controller. In other cases, a memory controller is integrated into the processor unit 405. In some cases, the processor unit 405 is configured to execute computer-readable instructions stored in a memory to perform various functions. In some embodiments, a processor unit 405 includes special purpose components for modem processing, baseband processing, digital signal processing, or transmission processing.

Examples of a memory unit 410 include random access memory (RAM), read-only memory (ROM), or a hard disk. Examples of memory unit 410 include solid state memory and a hard disk drive. In some examples, a memory unit 410 is used to store computer-readable, computer-executable software including instructions that, when executed, cause a processor to perform various functions described herein. In some cases, the memory unit 410 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 410 store information in the form of a logical state.

According to some embodiments, coreference model 415 is applied to the first sentence and the second sentence to generate the coreference information. In some examples, the coreference model 415 is configured to generate coreference information for a first sentence and a second sentence, wherein the coreference information identifies entities associated with both a term of the first sentence and a term of the second sentence. In some examples, the coreference model 415 includes a neuralcoref model.

In an embodiment, coreference model 415 identifies coreference information for the pair of sentences, where the coreference information identifies entities associated with terms from the pair of sentences.

In some examples, coreference model 415 may include a Stanford CoreNLP model, an AllenNLP coreference model or Hugging Face's neural coref model. The neural coref model applies a neural coreference resolution system based on neural nets and Python® spaCy.

According to some embodiments, sentence fusion network 420 receives coreference information for a first sentence and a second sentence, where the coreference information identifies entities associated with both a term of the first sentence and a term of the second sentence. In some examples, the sentence fusion network 420 applies an entity constraint to an attention head of the sentence fusion network 420, where the entity constraint limits attention weights of the attention head to terms that correspond to a same entity of the coreference information. In some examples, sentence fusion network 420 predicts a fused sentence based on the entity constraint, where the fused sentence combines information from the first sentence and the second sentence.

In some examples, sentence fusion network 420 generates a previous representation of words in the first sentence and the second sentence at a previous layer of the sentence fusion network 420. The sentence fusion network 420 then generates a key vector, a query vector, and a value representation for the first sentence and the second sentence based on the previous representation using the attention head. The sentence fusion network 420 then computes weighting coefficients for words in the first sentence and the second sentence based on the entity constraint. The sentence fusion network 420 then weights values of the value representation using the weighting coefficients to produce a constrained representation, where the fused sentence is based on the constrained representation. Additionally, the entity constraint includes a finite positive constraint coefficient for words belonging to a same entity as a current word, and an infinite negative constraint coefficient otherwise.

In some examples, each word of the fused sentence is predicted serially by applying the sentence fusion network 420 using the first sentence, the second sentence, and previously generated words of the fused sentence as input. The sentence fusion network 420 performs a beam search algorithm to select each word of the fused sentence. In some examples, sentence fusion network 420 identifies an end-of-sentence token. The sentence fusion network 420 outputs the fused sentence based on the end-of-sentence token.

In some examples, sentence fusion network 420 identifies a limited bi-directional mask that constrains attention for words in the fused sentence to the first sentence, the second sentence, and previously generated words of the fused sentence, and that constraints attention for words in the first sentence and the second sentence to the words in the first sentence and the second sentence. The limited bi-directional mask includes a matrix with indices representing words from the first sentence, the second sentence, and the fused sentence. In some examples, sentence fusion network 420 applies a softmax function based on the limited bi-directional mask.

According to some embodiments, sentence fusion network 420 comprises a transformer model wherein at least one attention head of the transformer model is constrained by an entity constraint that limits attention weights of the attention head to words that correspond to a same entity of the coreference information. In some examples, the sentence fusion network 420 is based on a pre-trained bidirectional encoder representations from transformers (BERT) model. In some examples, the sentence fusion network 420 includes a decoder-only transformer architecture.

In some examples, the transformer model includes 12 different transformer heads, 12 layers and hence a total of 12×12=144 different heads. An attention head refers to a first attention head of a transformer layer (e.g., the fifth layer of the transformer model). In some cases, each attention head in each layer may have a similar function.

According to some embodiments, sentence fusion network 420 applies an entity constraint to an attention head of the sentence fusion network 420, where the entity constraint limits attention weights of the attention head to words that correspond to a same entity of the coreference information. In some examples, sentence fusion network 420 predicts a fused sentence based on the entity constraint.

In some examples, sentence fusion network 420 generates a previous representation of words in the pair of sentences at a previous layer of the sentence fusion network 420. The sentence fusion network 420 then generates a key vector, a query vector, and a value representation based on the previous representation using the attention head. The sentence fusion network 420 then computes weighting coefficients for words in a first sentence of the pair of sentences and a second sentence of the pair of sentences based on the entity constraint. The sentence fusion network 420 then weights values of the value representation using the weighting coefficients to produce a constrained representation, where the fused sentence is based on the constrained representation. In some examples, sentence fusion network 420 identifies a limited bi-directional mask that constrains attention for a current word in the fused sentence to the pair of sentences and previously generated words of the fused sentence.

One or more embodiments of the present disclosure provide an apparatus and methods for information fusion in the context of neural abstractive summarization by using points of correspondence between sentences. In an embodiment, the sentence fusion network 420 includes an enriched Transformers with PoC information, and performance of the network model is evaluated on a new test bed for information fusion. In some cases, the sentence fusion network 420 can be used to summarize long documents and book chapters. Sentence fusion network 420 is an example of, or includes aspects of, the corresponding element described with reference to FIG. 5.

According to some embodiments, text summarization component 425 receives text including the first sentence, the second sentence, and additional sentences. In some examples, text summarization component 425 generates a summary for the text, where the summary includes the fused sentence and at least one additional summary sentence including information from the additional sentences. According to some embodiments, text summarization component 425 is configured to generate a text summary based on the sentence fusion network 420.

According to some embodiments, training component 430 receives a training set, where an element of the training set includes a pair of sentences and a ground truth fused sentence. In some examples, training component 430 computes a loss function based on the predicted fused sentence and the ground truth fused sentence. In some examples, training component 430 updates parameters of the sentence fusion network 420 based on the loss function. In some examples, training component 430 receives a pre-trained bi-directional transformer network including the parameters. In some examples, training component 430 fine-tunes the pre-trained bi-directional transformer network based on the updated parameters to train the sentence fusion network 420.

According to example embodiments, a method of providing an apparatus for sentence fusion includes providing a coreference model configured to generate coreference information for a first sentence and a second sentence, wherein the coreference information identifies entities associated with both a term of the first sentence and a term of the second sentence and a sentence fusion network comprising a transformer model wherein at least one attention head of the transformer model is constrained by an entity constraint that limits attention weights of the attention head to words that correspond to a same entity of the coreference information.

In some examples, the sentence fusion network is based on a pre-trained bidirectional encoder representations from transformers (BERT) model. In some examples, the sentence fusion network comprises a decoder-only transformer architecture. In some examples, the coreference model comprises a neuralcoref model. Some examples of the apparatus and method described above further include a text summarization component configured to generate a text summary based on the sentence fusion network.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 5:
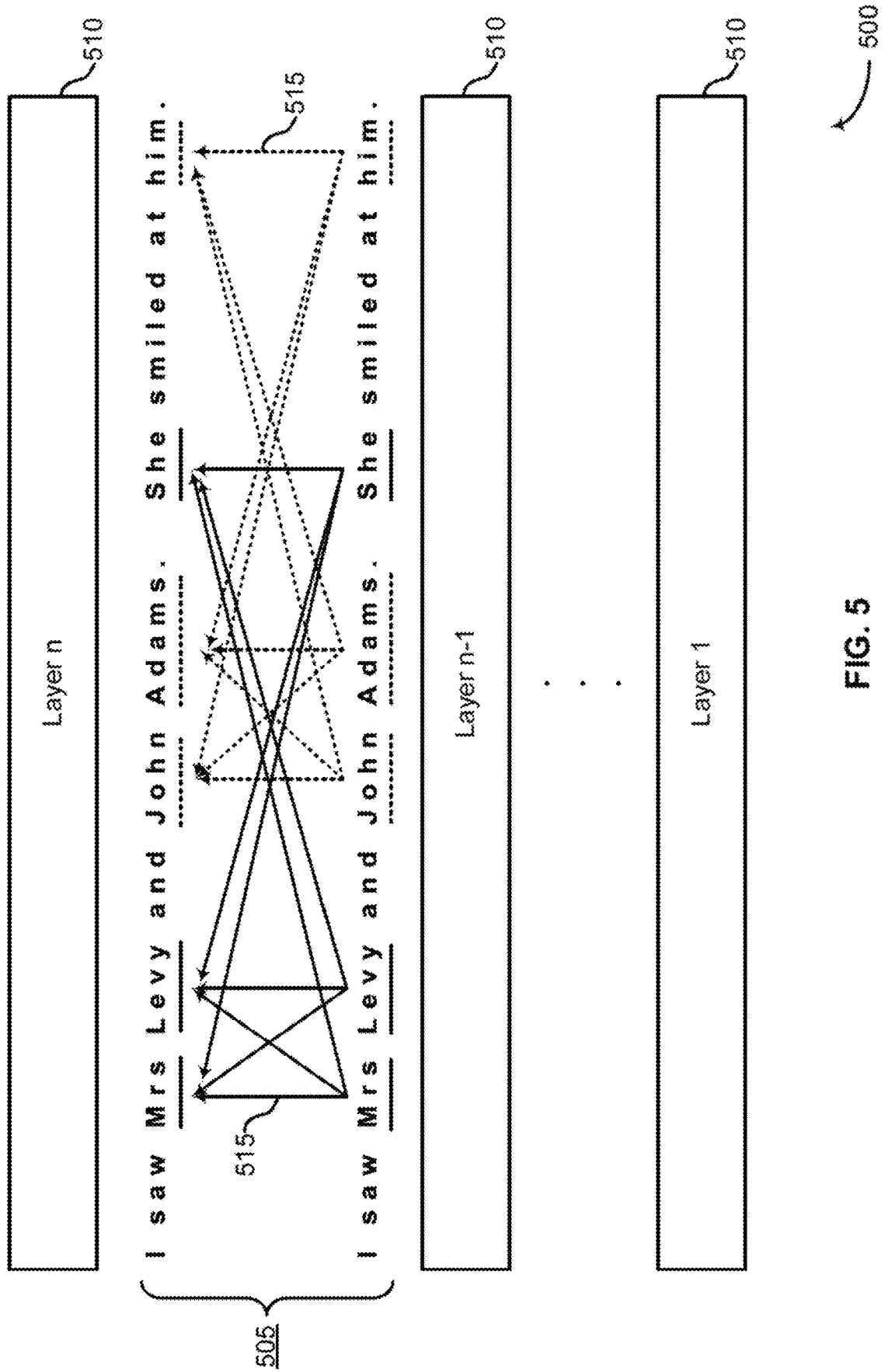
FIG. 5 shows an example of an entity constraint for a sentence fusion network according to aspects of the present disclosure.

FIG. 5 shows an example of an entity constraint for a sentence fusion network 500 according to aspects of the present disclosure. Sentence fusion network 500 is an example of, or includes aspects of, the corresponding element described with reference to FIG. 4. In one embodiment, sentence fusion network 500 includes attention head 505. The entity constraint 515 is applied to the attention head 505 of a network layer. Layers 510 may be referred to a layer 1, a layer 2, . . . a layer n-1, or a layer n as shown in FIG. 5.

At inference time (e.g., experiments and evaluation), a neuralcoref model such as HuggingFace (i.e., a coreference model) may be used. The coreference model identifies all entities (points of correspondence or PoC) in the sentences, along with all of their corresponding mentions in the sentences. The sentence pair can be input to a Transformer decoder model. One or more embodiments provide methods of inputting the PoC and mentions generated from the coreference resolver to a text summarization network.

In an embodiment, to create the representations for each word in layer n of a Transformer, the sentence fusion network 500 takes a weighted sum of the representations of all the words in the previous layer n-1. Furthermore, query, key, and value representations are generated using the attention head 505.

According to an embodiment, the sentence fusion network 500 is configured to dedicate one attention head 505 of the Transformer architecture to allow mentions of the same PoC build representations only based on each other, so that their semantic representations are similar. In this embodiment, the words belonging to a first entity (including "Mrs.", "Levy", and "She") are configured to exclusively take information from the words belonging to the same first entity (denoted by the solid line arrows) from the previous layer. The words belonging to a second entity (words including "John", "Adams", and "him") are configured to exclusively take information from the words belonging to the same second entity (denoted by the dashed line arrows) from the previous layer.

Figure 6:
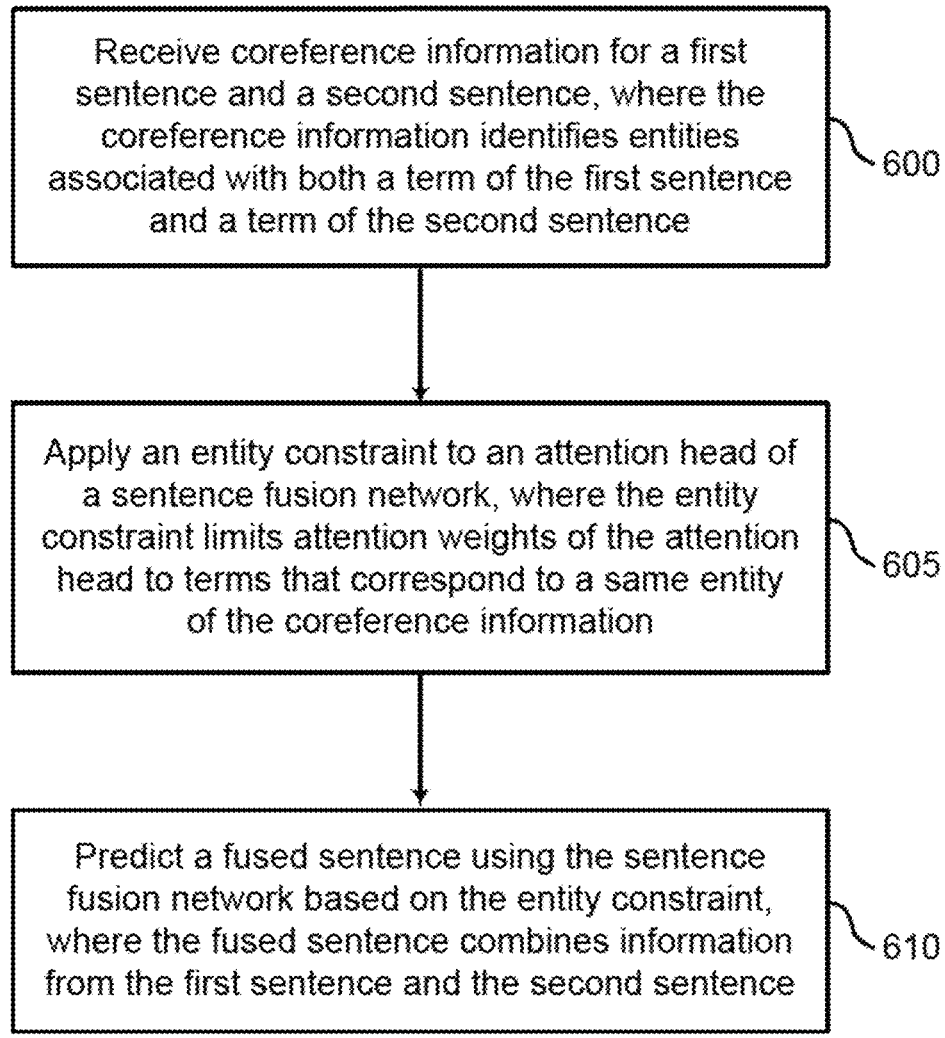
FIG. 6 shows an example of a process for sentence fusion according to aspects of the present disclosure.

FIG. 6 shows an example of a process for sentence fusion according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for sentence fusion is described. Embodiments of the method are configured to receive coreference information for a first sentence and a second sentence, wherein the coreference information identifies entities associated with both a term of the first sentence and a term of the second sentence, apply an entity constraint to an attention head of a sentence fusion network, wherein the entity constraint limits attention weights of the attention head to terms that correspond to a same entity of the coreference information, and predict a fused sentence using the sentence fusion network based on the entity constraint, wherein the fused sentence combines information from the first sentence and the second sentence.

At operation 600, the system receives coreference information for a first sentence and a second sentence, where the coreference information identifies entities associated with both a term of the first sentence and a term of the second sentence. In some cases, the operations of this step refer to, or may be performed by, a sentence fusion network as described with reference to FIGS. 4 and 5.

In an embodiment, the sentence fusion network includes a Transformer model that makes use of PoC information for sentence fusion. The sentence fusion network is configured to feature PoC mentions (i.e., not limited to feature pairwise relationships between tokens). In some examples, PoC mentions are text chunks of varying size. As a result, the sentence fusion network is able to embed knowledge of coreference.

At operation 605, the system applies an entity constraint to an attention head of a sentence fusion network, where the entity constraint limits attention weights of the attention head to terms that correspond to a same entity of the coreference information. In some cases, the operations of this step refer to, or may be performed by, a sentence fusion network as described with reference to FIGS. 4 and 5.

In an embodiment, the system is configured to permit mentions of the same PoC to be connected with each other. In some cases, one attention head is configured to focus on tokens belonging to the same PoC, allowing these tokens to share semantic representations. Sharing representation is useful as these mentions are related by complex morpho-syntactic, syntactic or semantic constraints.

In some embodiments, let $z=\{z_1, \ldots, z_{|z|}\}$ be a sequence containing PoC information, where $z_i \in \{0, \ldots, K\}$ indicates the index of PoC to which the token $x_i$ belongs. $z_i=0$ indicates $x_i$ is not associated with any PoC. The system selects an attention head h from the l-th layer of the Transformer model. The attention head h governs tokens that belong to PoCs ($z_i \neq 0$). Its hidden representation $h_i^l$ is computed by modeling only pairwise relationships between token i and any token j of the same PoC ($z_i = z_j$), while other tokens are excluded from consideration.

$$M_{i,j}^h = \begin{cases} 0, & \text{if } i, j \leq |x| \text{ and } z_i = z_j \\ -\infty, & \text{otherwise} \end{cases} \quad (1)$$

For example, "Allan Donald" and "The 48-year-old former Test paceman" are co-referring mentions. The sentence fusion network is configured to let these tokens exclusively attend to each other when learning representations using the attention head h. These tokens are likely to yield similar representations. The system allows tokens of the same PoC to be treated equivalently during summary generation.

In an embodiment, the first attention head from the l-th layer is dedicated to coreferring mentions. The attention head encourages tokens of the same PoC to share similar representations. Results suggest that the attention head of the 5-th layer achieves competitive performance, while most attention heads perform better than baseline models.

As the equation formulated below, an entity constraint includes a finite positive constraint coefficient for words belonging to a same entity as a current word, and an infinite negative constraint coefficient otherwise.

$$\alpha_i = \frac{\exp(m_i e_i)}{\Sigma_k \exp(m_k e_k)} \quad (2)$$

where $m_i = 1$ if $x_i$ belongs to the same entity as the current word, otherwise $m_i = -\infty$. $m_i$ masks out the words that do not belong to the same entity as the current word. In this way, the Transformer model understands which words belong to the same entity. This in turn helps the model better understand the input sentences, allowing the model to fuse the sentences with increased accuracy and efficiency. The words that do not belong to any entity are computed by taking a weighted sum of all the words in the sentences.

In an embodiment, additionally, the Transformer decoder is implemented based on a pretrained BERT model. This takes advantage of the vast language knowledge captured from pretraining on large amounts of data. It greatly increases the generation capabilities of the fusion mode.

At operation 610, the system predicts a fused sentence using the sentence fusion network based on the entity constraint, where the fused sentence combines information from the first sentence and the second sentence. In some cases, the operations of this step refer to, or may be performed by, a sentence fusion network as described with reference to FIGS. 4 and 5.

An apparatus for sentence fusion is described. The apparatus includes a processor, memory in electronic communication with the processor, and instructions stored in the memory. The instructions are operable to cause the processor to receive coreference information for a first sentence and a second sentence, wherein the coreference information identifies entities associated with both a term of the first sentence and a term of the second sentence, apply an entity constraint to an attention head of a sentence fusion network, wherein the entity constraint limits attention weights of the attention head to terms that correspond to a same entity of the coreference information, and predict a fused sentence using the sentence fusion network based on the entity constraint, wherein the fused sentence combines information from the first sentence and the second sentence.

A non-transitory computer readable medium storing code for sentence fusion is described. In some examples, the code comprises instructions executable by a processor to receive coreference information for a first sentence and a second sentence, wherein the coreference information identifies entities associated with both a term of the first sentence and a term of the second sentence, apply an entity constraint to an attention head of a sentence fusion network, wherein the entity constraint limits attention weights of the attention head to terms that correspond to a same entity of the coreference information, and predict a fused sentence using the sentence fusion network based on the entity constraint, wherein the fused sentence combines information from the first sentence and the second sentence.

Some examples of the method, apparatus, and non-transitory computer readable medium described above further include applying a coreference model to the first sentence and the second sentence to generate the coreference information.

Some examples of the method, apparatus, and non-transitory computer readable medium described above further include generating a previous representation of words in the first sentence and the second sentence at a previous layer of the sentence fusion network. Some examples further include generating a key vector, a query vector, and a value representation for the first sentence and the second sentence based on the previous representation using the attention head. Some examples further include computing weighting coefficients for words in the first sentence and the second sentence based on the entity constraint. Some examples further include weighting values of the value representation using the weighting coefficients to produce a constrained representation, wherein the fused sentence is based on the constrained representation.

In some examples, the entity constraint comprises a finite positive constraint coefficient for words belonging to a same entity as a current word, and an infinite negative constraint coefficient otherwise. In some examples, each word of the fused sentence is predicted serially by applying the sentence fusion network using the first sentence, the second sentence, and previously generated words of the fused sentence as input.

Some examples of the method, apparatus, and non-transitory computer readable medium described above further include performing a beam search algorithm to select each word of the fused sentence.

Some examples of the method, apparatus, and non-transitory computer readable medium described above further include identifying an end-of-sentence token. Some examples further include outputting the fused sentence based on the end-of-sentence token.

Some examples of the method, apparatus, and non-transitory computer readable medium described above further include identifying a limited bi-directional mask that constrains attention for words in the fused sentence to the first sentence, the second sentence, and previously generated words of the fused sentence, and that constraints attention for words in the first sentence and the second sentence to the words in the first sentence and the second sentence.

In some examples, the limited bi-directional mask comprises a matrix with indices representing words from the first sentence, the second sentence, and the fused sentence. Some examples of the method, apparatus, and non-transitory computer readable medium described above further include applying a softmax function based at least in part on the limited bi-directional mask.

Some examples of the method, apparatus, and non-transitory computer readable medium described above further include receiving text comprising the first sentence, the second sentence, and additional sentences. Some examples further include generating a summary for the text, wherein the summary comprises the fused sentence and at least one additional summary sentence including information from the additional sentences.

Figure 7:
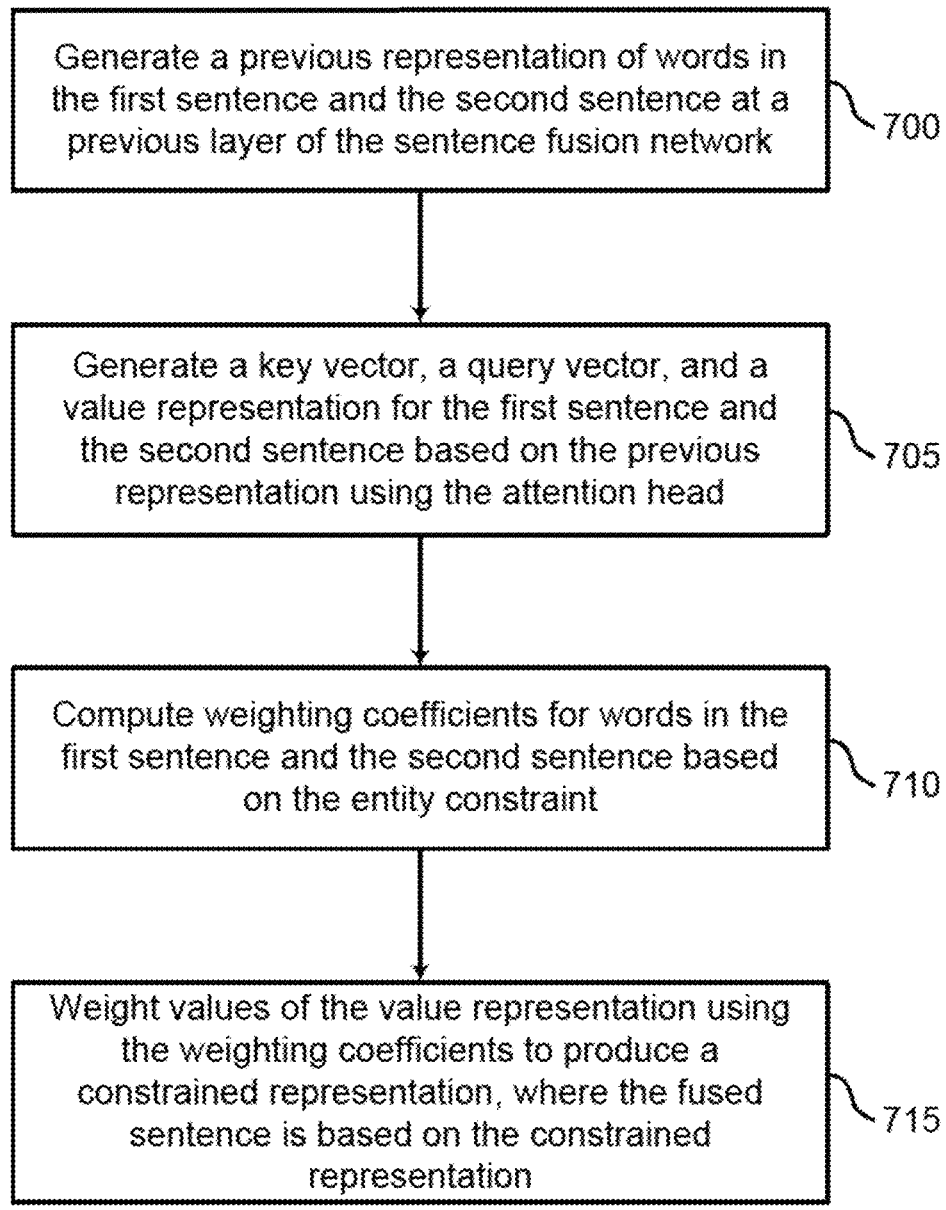
FIG. 7 shows an example of a process for applying an entity constraint according to aspects of the present disclosure.

FIG. 7 shows an example of a process for applying an entity constraint according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system generates a previous representation of words in the first sentence and the second sentence at a previous layer of the sentence fusion network. According to an embodiment, the sentence fusion network is based on a pre-trained BERT model, and the Transformer decoder is implemented based on the pretrained BERT model. The system makes use of the vast language knowledge captured from pretraining on large amounts of data. In some cases, the operations of this step refer to, or may be performed by, a sentence fusion network as described with reference to FIGS. 4 and 5.

According to an embodiment, the sentence fusion network is based on a bidirectional encoder representations from transformers (BERT) architecture. In some examples, BERT is used as a language representation model, and is configured to pretrain deep bidirectional representations from unlabeled text by jointly conditioning on both left and right context in all layers. As a result, the pre-trained BERT model can be finetuned with an additional output layer to create network models for specific tasks (e.g., question answering and language inference).

In some examples, BERT uses a masked language model (MLM or Masked LM) pre-training objective to alleviate the unidirectionality constraint. The masked language model randomly masks some of the tokens from the input, and the objective is to predict the original vocabulary id of the masked word based only on its context. Unlike left-to-right language model pre-training, the MLM objective enables the representation to fuse the left and the right context, which pretrains a deep bidirectional transformer. In addition to the masked language model, BERT includes a next sentence prediction (NSP) task that jointly pretrains text-pair representations.

According to an embodiment, the pre-trained BERT model is stacked by L bidirectional transformer layers. At each layer, it iteratively revises the representation of every position by exchanging information across all positions at the previous layer in parallel with the transformer layer.

At operation 705, the system generates a key vector, a query vector, and a value representation for the first sentence and the second sentence based on the previous representation using the attention head. In some cases, the operations of this step refer to, or may be performed by, a sentence fusion network as described with reference to FIGS. 4 and 5.

In an embodiment, the system includes a Transformer model, which takes as input a sequence S formed by concatenating the source and summary sequences. Let $H^l = [h_1^l, \ldots, h_{|S|}^l]$ be hidden representations of the l-th layer of a decoder-only architecture. An attention head transforms each vector respectively into a query vector ($q_i$), key vector ($k_j$) and value vector ($v_j$).

At operation 710, the system computes weighting coefficients for words in the first sentence and the second sentence based on the entity constraint. In some cases, the operations of this step refer to, or may be performed by, a sentence fusion network as described with reference to FIGS. 4 and 5.

The attention weight $\alpha_{i,j}$ is computed for all pairs of tokens by taking the scaled dot product of query and key vectors and applying softmax over the output (Equation 3). $\alpha_{i,j}$ indicates the importance of token j to constructing $h_i^l$ of the current token i.

$$\alpha_{i,j} = \frac{\exp\left(\frac{q_i^T k_j}{\sqrt{d_k}} + M_{i,j}\right)}{\sum_{j'=1}^{|S|} \exp\left(\frac{q_i^T k_{j'}}{\sqrt{d_k}} + M_{i,j'}\right)} \quad (3)$$

In some examples, a softmax function is used as an activation function of the neural network to normalize the output of the network to a probability distribution over predicted output classes. After applying the softmax function, each component of the feature map is in the interval (0, 1) and the components add up to one. These values are interpreted as probabilities.

In an embodiment, a mask $\mathcal{M} \in \mathbb{R}^{|S| \times |S|}$ is used to control the attention of the model (Equation 4). $\mathcal{M}_{i,j}=0$ allows token i to attend to j and $\mathcal{M}_{i,j}=-\infty$ prevents i from attending to j as it leads $\alpha_{i,j}$ to be zero after softmax normalization. A source token (i≤|x|) can attend to all other source tokens ($\mathcal{M}_{i,j}=0$ for j≤|x|). A summary token (i>|x|) can attend to all tokens including itself and those prior to it ($\mathcal{M}_{i,j}=0$ for j≤i). The mask $\mathcal{M}$ provides desired flexibility in terms of building hidden representations for tokens in S. The output of the attention head is a weighted sum of the value vectors $h_i^l = \sum_{j=1}^{|S|} \alpha_{i,j} v_j$.

$$\mathcal{M}_{i,j} = \begin{cases} 0, & \text{if } j \le \max(i, |x|) \\ -\infty, & \text{otherwise} \end{cases} \quad (4)$$

Detail regarding the mask matrix is described below with reference to FIG. 8.

At operation 715, the system weights values of the value representation using the weighting coefficients to produce a constrained representation, where the fused sentence is based on the constrained representation. In some cases, the operations of this step refer to, or may be performed by, a sentence fusion network as described with reference to FIGS. 4 and 5.

In an embodiment, to create the representations, h, for each word in layer n of a Transformer architecture (e.g., decoder-only transformer architecture), the system takes a weighted sum of the representations of all the words in the previous layer n-1.

$$h = \sum_i \alpha_i v_i \qquad (5)$$

$$e_i = \frac{q \cdot k_i}{\sqrt{d_k}} \qquad (6)$$

$$\alpha_i = \frac{\exp(e_i)}{\sum_k \exp(e_k)} \qquad (7)$$

where q, k, and v are the query, key, and value representations, as used in attention mechanisms.

The equation (7) above is replaced with the equation below. As shown in the equation below, an entity constraint includes a finite positive constraint coefficient for words belonging to a same entity as a current word, and an infinite negative constraint coefficient otherwise.

$$\alpha_i = \frac{\exp(m_i e_i)}{\Sigma_k \exp(m_k e_k)} \qquad (8)$$

where $m_i=1$ if $x_i$ belongs to the same entity as the current word, otherwise $m_i=-\infty$.

Figure 8:
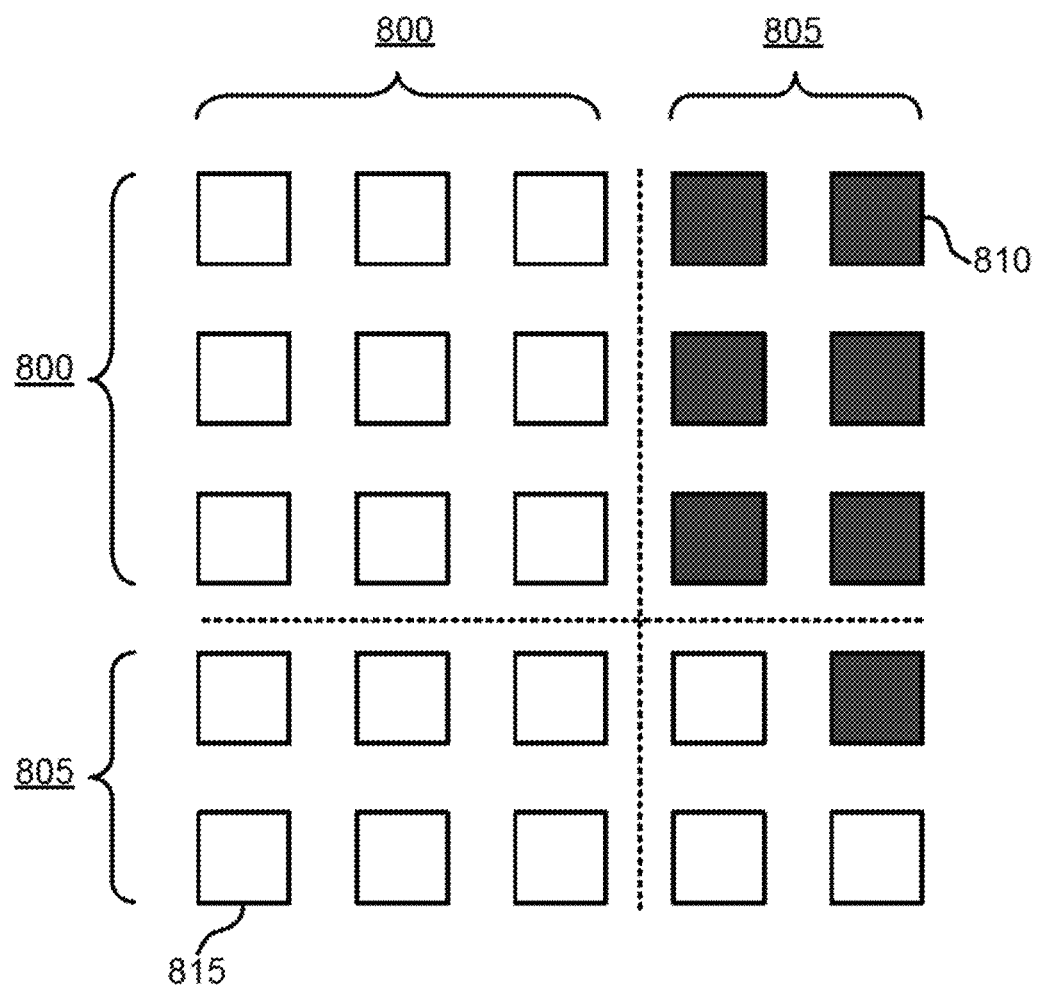
FIG. 8 shows an example of a mask matrix according to aspects of the present disclosure.

FIG. 8 shows an example of a mask matrix according to aspects of the present disclosure. The example shown includes a pair of sentences 800, fused sentence 805, masked element 810, and unmasked element 815. Fused sentence 805 is an example of, or includes aspects of, the corresponding element described with reference to FIG. 3.

According to an embodiment, the Transformer is configured to have a bidirectional context for the encoder part (the pair of sentences to be fused), and a left-to-right context for the decoder part (the generated fused sentence). The sentence fusion network applies a mask to the attention mechanism to prevent tokens from taking information that they should not be able to see.

$$Q = H^{l-1} W_l^Q, \qquad (9)$$

$$K = H^{l-1} W_l^K,$$

$$V = H^{l-1} W_l^V$$

$$M_{ij} = f(x) = \begin{cases} 0, & \text{allow to attend} \\ -\infty, & \text{prevent from attending} \end{cases} \qquad (10)$$

$$A_l = \text{softmax}\left(\frac{QK^T}{\sqrt{d_k}} + M\right) V_l \qquad (11)$$

where M is the mask matrix (an example mask matrix is illustrated in FIG. 8). A mask matrix is formulated and described below.

In an embodiment, S1 is a notation that includes a pair of sentences 800 to be fused. S2 is a notation that represents the generated fused sentence 805. During both training and testing, the sentence fusion network has full access to these tokens, thus there is no masking for these tokens (represented by the white squares near the top-left corner). Similarly, the tokens in S2 should have full access to S1 (white squares near bottom-left corner, unmasked element 815). However, the tokens in S1 should not be able to view tokens in S2, which is the generated fused sentence 805 (dark-colored squares near top-right corner, masked element 810). Finally, the tokens in S2 should only be able to see their previous tokens in S2, since the tokens are generated in a left-to-right manner (bottom-right corner).

In an embodiment, the sentence fusion network is based on a pre-trained BERT model. To apply a pre-trained BERT to sentence fusion, the BERT model is fine-tuned for the task below. A fusion example is given to the model, but with 70% of the tokens replaced with a [MASK] token. The model predicts the value of the [MASK] tokens. One embodiment applies the mask matrix M to the attention mechanism to prevent the sentence fusion network from having information that will not be available at test time. Thus, the sentence fusion network learns to fuse pairs of sentences.

In an embodiment, at testing, each token is generated in a left-to-right manner by appending a [MASK] token to the end of the input pair of sentences. At each time step, the sentence fusion network predicts the next token. One example uses beam search with k of 5 to improve the generation results. The generation process ends when an "end of sentence" token is generated.

In an embodiment, the sentence fusion network fine-tunes the model on a sentence fusion dataset using a denoising objective, where 70% of the summary tokens are randomly masked out. The model is trained to predict the original tokens conditioned on hidden vectors of MASK tokens:

$$o = \text{softmax}(W^o \text{GeLU}(W^h h_{MASK}^L))) \qquad (12)$$

where parameters $W^o$ are tied with token embeddings. By inserting markup tokens, the network model provides a soft linking mechanism to allow mentions of the same PoC to be used interchangeably in summary generation.

In an example, a first sentence is "John Smith has a dog." A second sentence is "He loves it." Special tokens [S] and [E] are used to mark the start and end of "John Smith", respectively. Similarly, tokens [S] and [E] are used to mark the start and end of "He", respectively. Without PoC linking, the focus of the model attention can shift a long distance from "John" to "loves" to generate the next summary word. The sentence fusion network substantially reduces the shifting distance, and the model can hop to the special token "[E]" then to "loves," facilitating summary generation.

In an embodiment, the sentence fusion network facilitates summary generation by reducing the shifting distance, such that the model attention is configured to shift from "John" to the tokens "[E]" then to "loves" for predicting the next summary word.

Training and Evaluation

Figure 9:
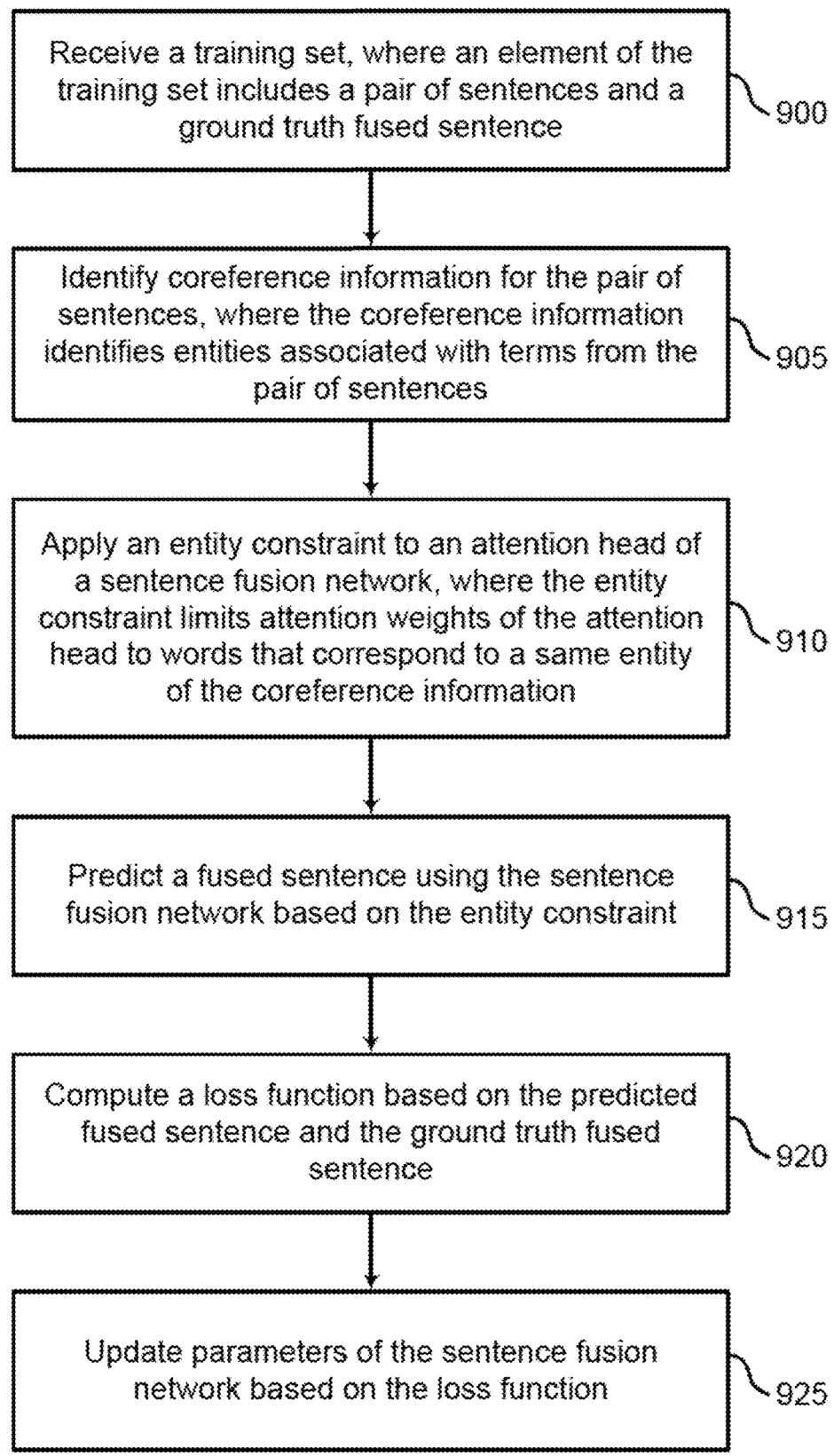
FIG. 9 shows an example of a process for training a sentence fusion network according to aspects of the present disclosure.

FIG. 9 shows an example of a process for training a sentence fusion network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for training a neural network is described. Embodiments of the method are configured to receive a training set, wherein an element of the training set includes a pair of sentences and a ground truth fused sentence, identify coreference information for the pair of sentences, wherein the coreference information identifies entities associated with terms from the pair of sentences, apply an entity constraint to an attention head of a sentence fusion network, wherein the entity constraint limits attention weights of the attention head to words that correspond to a same entity of the coreference information, predict a fused sentence using the sentence fusion network based on the entity constraint, compute a loss function based on the predicted fused sentence and the ground truth fused sentence, and update parameters of the sentence fusion network based on the loss function.

Accordingly, the parameters and weights of a text summarization apparatus are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

One or more embodiments of the present disclosure use supervised training techniques. A supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. in other words, the learning algorithm generalizes from the training data to unseen examples.

At operation 900, the system receives a training set, where an element of the training set includes a pair of sentences and a ground truth fused sentence. In some examples, a pair of sentences are also referred to as a source content. According to an example shown in FIG. 3, the pair of sentences includes a first sentence and a second sentence. The first sentence is "Allan Donald has confirmed he is to step down as South Africa bowling coach." The second sentence is "The 48-year-old former Test paceman has served his country as part of the coaching team since 2011." The ground truth fused sentence is an accurate and truthful summarization of the first sentence and the second sentence. According to the example above, a ground truth fused sentence can be something like "Allan Donald served as South Africa bowling coach since 2011." In some cases, the operations of this step refer to, or may be performed by, a training component as described with reference to FIG. 4.

Given a training set of pairs of sentences along with the corresponding ground truth fused sentences, the sentence fusion apparatus trains a model that can effectively fuse pairs of sentences from an unseen test set. In some examples, the pairs of sentences in the training set are processed using a coreference resolution model.

At operation 905, the system identifies coreference information for the pair of sentences, where the coreference information identifies entities associated with terms from the pair of sentences. In some cases, the operations of this step refer to, or may be performed by, a coreference model as described with reference to FIG. 4.

In some embodiments, the sentence fusion network is configured to retain core semantics such as "who did what to whom." To retain core semantics, the network model understands the points of correspondence (PoC) between sentences. Points of correspondence are what connect two sentences together, which can be entities and events that are in common between the two sentences. Establishing points of correspondence contributes to retaining semantics, because it informs a fusion system of the cohesive ties between input sentences.

In some examples, the sentence fusion network can fuse two sentences into a single output sentence that retains important information and remains grammatically correct. In an embodiment, the sentence fusion network takes into account a varying number of points of correspondence between sentences to produce a coherent output sentence.

In some example, HuggingFace's neuralcoref model is used to identify all entities (PoC) in the sentences, along with all of their corresponding mentions in the sentences. The sentence pair can be input to a Transformer decoder network. One embodiment provides a method of inputting the PoC and mentions derived from a coreference resolver.

At operation 910, the system applies an entity constraint to an attention head of a sentence fusion network, where the entity constraint limits attention weights of the attention head to words that correspond to a same entity of the coreference information. In some cases, the operations of this step refer to, or may be performed by, a sentence fusion network as described with reference to FIGS. 4 and 5.

According to an embodiment, the sentence fusion network is configured to dedicate one attention head of the Transformer architecture which let mentions of the same PoC build representations only based on each other, so that their semantic representations are similar. In an example, the words belonging to entity A (see FIG. 5, "Mrs.", "Levy", and "She") are configured to exclusively take information from the words belonging to that same entity (denoted by solid line arrows) from the previous layer. The words belonging to entity B ("John", "Adams", and "him") are configured to exclusively take information from the words belonging to that same entity (denoted by dash line arrows) from the previous layer.

At operation 915, the system predicts a fused sentence using the sentence fusion network based on the entity constraint. In some cases, the operations of this step refer to, or may be performed by, a sentence fusion network as described with reference to FIGS. 4 and 5.

At operation 920, the system computes a loss function based on the predicted fused sentence and the ground truth fused sentence. In some cases, the operations of this step refer to, or may be performed by, a training component as described with reference to FIG. 4.

In some examples, a supervised training model may be used that includes a loss function that compares predictions of the network with ground truth training data. The term loss function refers to a function that impacts how a machine learning model is trained in a supervised learning model. Specifically, during each training iteration, the output of the model is compared to the known ground-truth information in the training data. The loss function provides a value for how close the predicted output data is to the actual ground-truth data. After computing the loss function, the parameters of the sentence fusion network model are updated accordingly, and a new set of predictions are made during the next iteration.

The ground truth fused sentence provides information regarding a correct sentence fusion result given a pair of sentences. In some examples, the loss function may include a cross entropy loss.

At operation 925, the system updates parameters of the sentence fusion network based on the loss function. The training component of the system is configured to minimize the loss function through updating these parameters and weights during each iteration of training. In some examples, at training, parameters of the BERT model are updated. In some cases, the operations of this step refer to, or may be performed by, a training component as described with reference to FIG. 4.

An apparatus for training a neural network is described. The apparatus includes a processor, memory in electronic communication with the processor, and instructions stored in the memory. The instructions are operable to cause the processor to receive a training set, wherein an element of the training set includes a pair of sentences and a ground truth fused sentence, identify coreference information for the pair of sentences, wherein the coreference information identifies entities associated with terms from the pair of sentences, apply an entity constraint to an attention head of a sentence fusion network, wherein the entity constraint limits attention weights of the attention head to words that correspond to a same entity of the coreference information, predict a fused sentence using the sentence fusion network based on the entity constraint, compute a loss function based on the predicted fused sentence and the ground truth sentence, and update parameters of the sentence fusion network based on the loss function.

A non-transitory computer readable medium storing code for training a neural network is described. In some examples, the code comprises instructions executable by a processor to receive a training set, wherein an element of the training set includes a pair of sentences and a ground truth fused sentence, identify coreference information for the pair of sentences, wherein the coreference information identifies entities associated with terms from the pair of sentences, apply an entity constraint to an attention head of a sentence fusion network, wherein the entity constraint limits attention weights of the attention head to words that correspond to a same entity of the coreference information, predict a fused sentence using the sentence fusion network based on the entity constraint, compute a loss function based on the predicted fused sentence and the ground truth fused sentence, and update parameters of the sentence fusion network based on the loss function.

Some examples of the method, apparatus, and non-transitory computer readable medium described above further include receiving a pre-trained bi-directional transformer network comprising the parameters. Some examples further include fine-tuning the pre-trained bi-directional transformer network based on the updated parameters to train the sentence fusion network.

Some examples of the method, apparatus, and non-transitory computer readable medium described above further include generating a previous representation of words in the pair of sentences at a previous layer of the sentence fusion network. Some examples further include generating a key vector, a query vector, and a value representation based on the previous representation using the attention head. Some examples further include computing weighting coefficients for words in a first sentence of the pair of sentences and a second sentence of the pair of sentences based on the entity constraint. Some examples further include weighting values of the value representation using the weighting coefficients to produce a constrained representation, wherein the fused sentence is based on the constrained representation.

Some examples of the method, apparatus, and non-transitory computer readable medium described above further include identifying a limited bi-directional mask that constrains attention for a current word in the fused sentence to the pair of sentences and previously generated words of the fused sentence.

One or more embodiments of the present disclosure provide a text summarization apparatus and methods and a fusion dataset. The fusion dataset includes quality PoC annotations that were used as test bed for evaluating the text summarization apparatus. Performance of apparatus and methods of the present disclosure have been evaluated, and results indicate embodiments of the present disclosure provide an improvement over existing technology. The findings show the importance of modeling points of correspondence for sentence fusion tasks.

In some examples, the sentence fusion network is evaluated using a portion of the CNN/DailyMail summarization dataset. For each summary, summary sentences were created by fusing a pair of sentences from the source article and the summary sentences were extracted. This compiles a collection of sentence triples—a pair of sentences from the article and the corresponding fused sentence. The ROUGE metric is used to evaluate summarization models. ROUGE compares the machine-generated fused sentence with the gold standard fused sentence by counting the number of overlapping n-grams.

Methods of incorporating PoC into a Transformer model are compared to a baseline Transformer model that does not take PoC into account and a pointer generator network. The results are recorded. The coref-head model outperforms the baseline in all ROUGE metrics. Incorporating points of correspondence results in a 1-point increase in ROUGE-1 and a 0.5-point increase in ROUGE-2. This shows that explicitly informing a model of the relations between entities results in better understanding and better sentence fusions.

For reference, methods of the present disclosure are also compared to the summarization performance from a human. The systems and methods reduce the gap between automated sentence fusion and manual (done by a human) sentence fusion by about 30% for ROUGE-1, while achieving human performance for ROUGE-2.

The evaluation qualitatively compares the fusion outputs of each model. In an example, there are two input sentences to merge. The first sentence is "Stewart said that she and her husband, Joseph Naaman, booked Felix on their Etihad Airways flight from the United Arab Emirates to New York's John F. Kennedy International Airport on April 1." The second sentence is "Shortly after the plane arrived in New York that evening, Felix went missing somewhere on the grounds of the Kennedy Airport, according to Etihad Airways."

In an example, a baseline fusion model generates "Felix and Joseph Naaman went missing on the grounds of Kennedy Airport on April 1". The baseline fusion model includes the phrase "and Joseph Naaman," which incorrectly states that Joseph Naaman went missing. This is a common mistake among existing abstractive summarization/fusion models. On the other hand, the sentence fusion network accurately and truthfully fuses the two sentences, indicating that only Felix went missing. The sentence fusion network generates (e.g., using coref-head fusion) "Felix went missing on the grounds of John F. Kennedy International Airport on April 1."

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for sentence fusion, comprising:
receiving coreference information for a first sentence and a second sentence, wherein the coreference information identifies entities associated with both a term of the first sentence and a term of the second sentence;
applying an entity constraint to an attention head of a sentence fusion network, wherein the entity constraint limits attention weights of the attention head to terms that correspond to a same entity of the coreference information; and
predicting a fused sentence using the sentence fusion network based on the entity constraint, wherein the fused sentence combines information from the first sentence and the second sentence.

2. The method of claim 1, further comprising:
applying a coreference model to the first sentence and the second sentence to generate the coreference information.

3. The method of claim 1, further comprising:
generating a previous representation of words in the first sentence and the second sentence at a previous layer of the sentence fusion network;
generating a key vector, a query vector, and a value representation for the first sentence and the second sentence based on the previous representation using the attention head;
computing weighting coefficients for words in the first sentence and the second sentence based on the entity constraint; and
weighting values of the value representation using the weighting coefficients to produce a constrained representation, wherein the fused sentence is based on the constrained representation.

4. The method of claim 3, wherein:
the entity constraint comprises a finite positive constraint coefficient for words belonging to a same entity as a current word, and an infinite negative constraint coefficient otherwise.

5. The method of claim 1, wherein:
each word of the fused sentence is predicted serially by applying the sentence fusion network using the first sentence, the second sentence, and previously generated words of the fused sentence as input.

6. The method of claim 5, further comprising:
performing a beam search algorithm to select each word of the fused sentence.

7. The method of claim 5, further comprising:
identifying an end-of-sentence token; and
outputting the fused sentence based on the end-of-sentence token.

8. The method of claim 1, further comprising:
identifying a limited bi-directional mask that constrains attention for words in the fused sentence to the first sentence, the second sentence, and previously generated words of the fused sentence, and that constrains attention for words in the first sentence and the second sentence to the words in the first sentence and the second sentence.

9. The method of claim 8, wherein:
the limited bi-directional mask comprises a matrix with indices representing words from the first sentence, the second sentence, and the fused sentence.

10. The method of claim 8, further comprising:
applying a softmax function based at least in part on the limited bi-directional mask.

11. The method of claim 1, further comprising:
receiving text comprising the first sentence, the second sentence, and additional sentences; and
generating a summary for the text, wherein the summary comprises the fused sentence and at least one additional summary sentence including information from the additional sentences.

12. An apparatus for sentence fusion, comprising:
a coreference model configured to generate coreference information for a first sentence and a second sentence, wherein the coreference information identifies entities associated with both a term of the first sentence and a term of the second sentence; and
a sentence fusion network comprising a transformer model wherein at least one attention head of the transformer model is constrained by an entity constraint that limits attention weights of the attention head to words that correspond to a same entity of the coreference information.

13. The apparatus of claim 12, wherein:
the sentence fusion network is based on a pre-trained bidirectional encoder representations from transformers (BERT) model.

14. The apparatus of claim 12, wherein:
the sentence fusion network comprises a decoder-only transformer architecture.

15. The apparatus of claim 12, wherein:
the coreference model comprises a neuralcoref model.

16. The apparatus of claim 12, further comprising:
a text summarization component configured to generate a text summary based on the sentence fusion network.

17. A method for training a neural network, comprising:
receiving a training set, wherein an element of the training set includes a pair of sentences and a ground truth fused sentence;

identifying coreference information for the pair of sentences, wherein the coreference information identifies entities associated with terms from the pair of sentences;
applying an entity constraint to an attention head of a sentence fusion network, wherein the entity constraint limits attention weights of the attention head to words that correspond to a same entity of the coreference information;
predicting a fused sentence using the sentence fusion network based on the entity constraint;
computing a loss function based on the predicted fused sentence and the ground truth fused sentence; and
updating parameters of the sentence fusion network based on the loss function.

18. The method of claim 17, further comprising:
receiving a pre-trained bi-directional transformer network comprising the parameters; and
fine-tuning the pre-trained bi-directional transformer network based on the updated parameters to train the sentence fusion network.

19. The method of claim 17, further comprising:
generating a previous representation of words in the pair of sentences at a previous layer of the sentence fusion network;
generating a key vector, a query vector, and a value representation based on the previous representation using the attention head;
computing weighting coefficients for words in a first sentence of the pair of sentences and a second sentence of the pair of sentences based on the entity constraint; and
weighting values of the value representation using the weighting coefficients to produce a constrained representation, wherein the fused sentence is based on the constrained representation.

20. The method of claim 17, further comprising:
identifying a limited bi-directional mask that constrains attention for a current word in the fused sentence to the pair of sentences and previously generated words of the fused sentence.

* * * * *